Patented June 12, 1923.

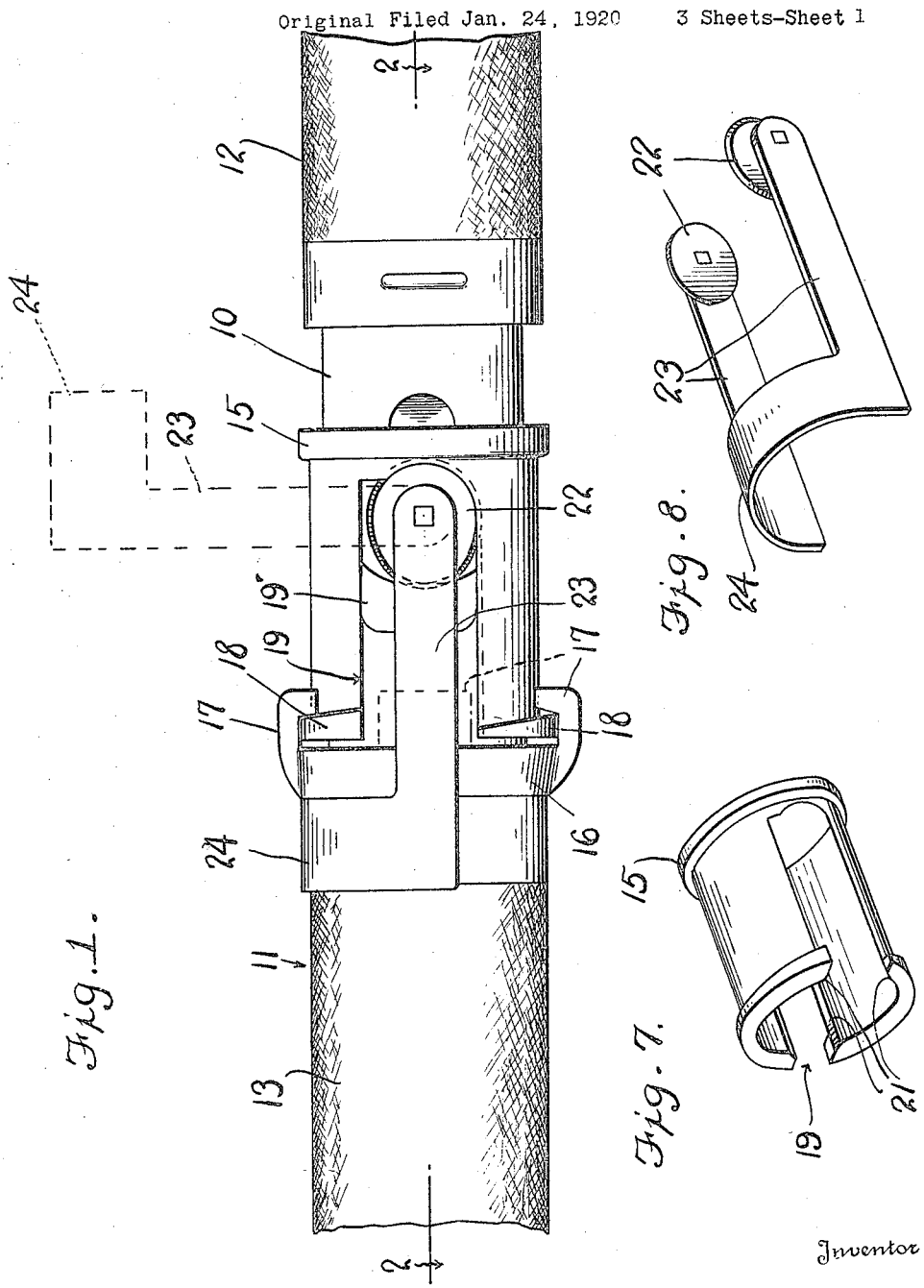

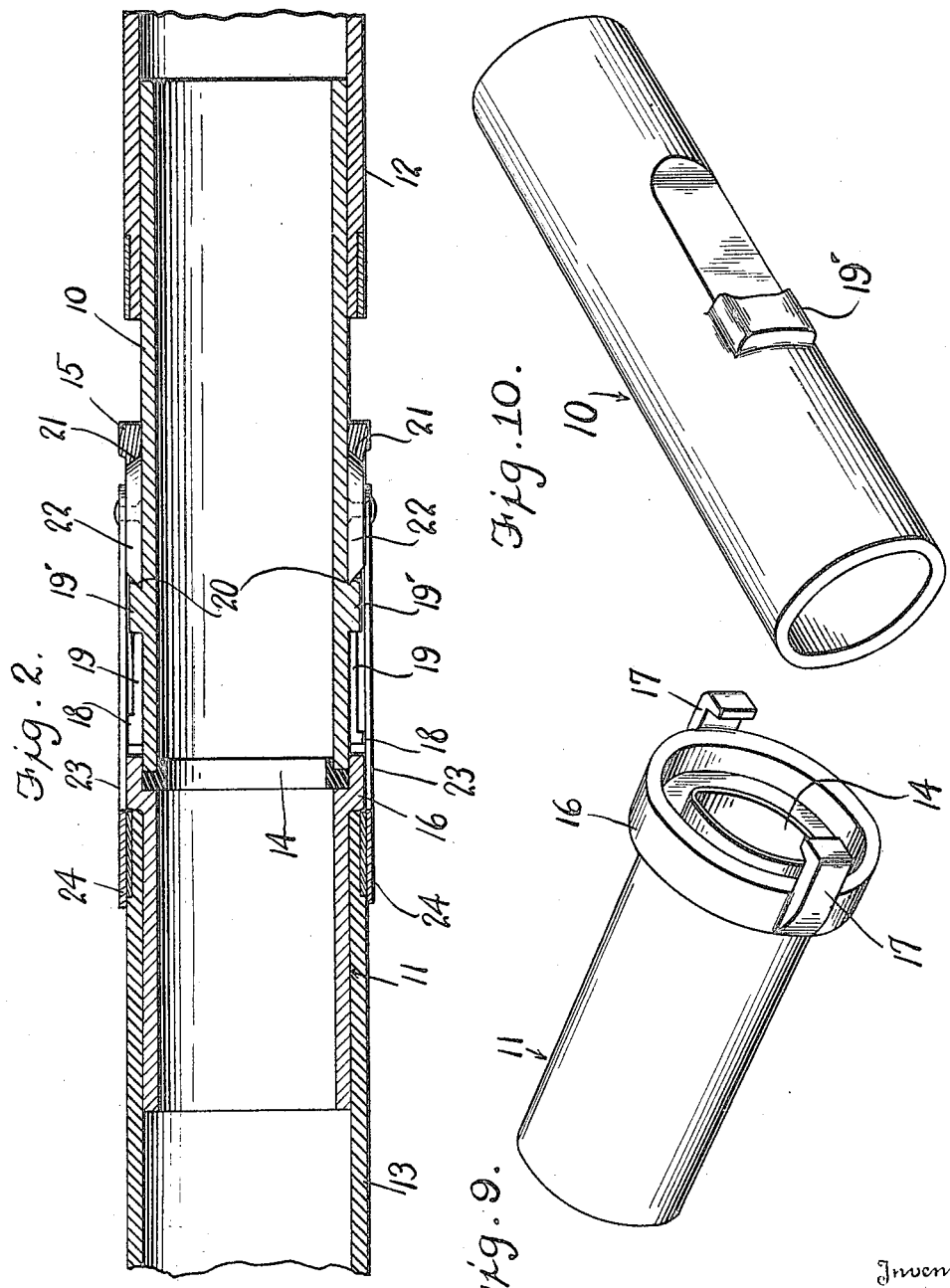

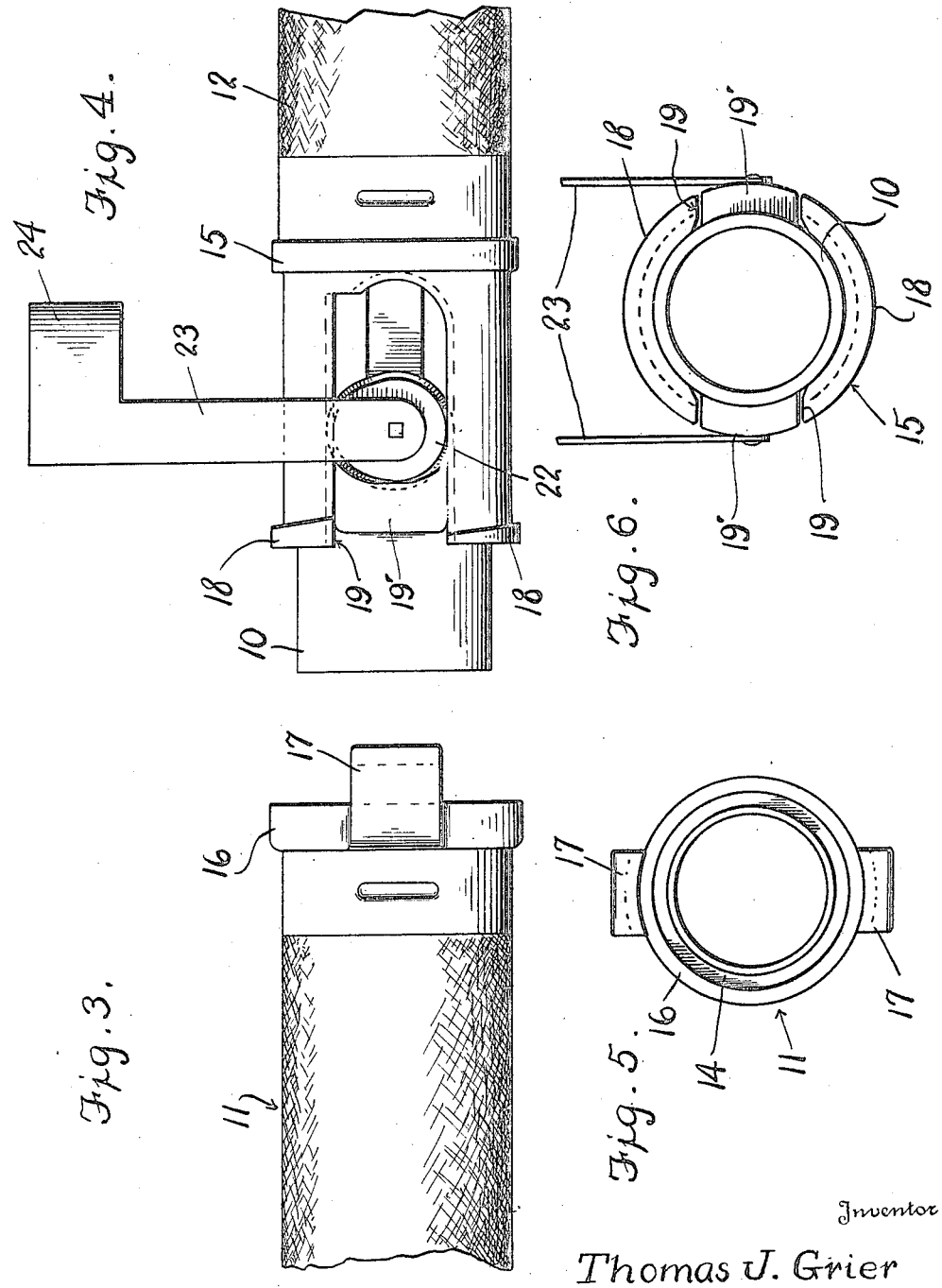

1,458,337

UNITED STATES PATENT OFFICE.

THOMAS J. GRIER, OF WEST PALM BEACH, FLORIDA.

COUPLING.

Application filed January 24, 1920, Serial No. 353,656. Renewed April 9, 1923.

*To all whom it may concern:*

Be it known that I, THOMAS J. GRIER, a citizen of the United States, residing at West Palm Beach, in the county of Palm Beach and State of Florida, have invented new and useful Improvements in Couplings, of which the following is a specification.

The object of the invention is to provide a coupling adapted for use in connection with hose, pipe sections and the like whereby a perfectly tight joint is assured when the parts are in their operative positions, and requiring the minimum effort and loss of time upon the part of the operator in effecting the coupling, all of the parts or elements of the device being separable to permit of independent construction or formation and hence of independent replacement in the event of breakage or injury, or should one or the other thereof become worn by constant use; and with these and related objects in view the invention consists in a construction, combination and relation of parts of which a preferred embodiment is illustrated in the accompanying drawings, it being understood that changes in form, proportion and details may be resorted to within the scope of the appended claim without departing from the principles involved.

In the drawings:—

Figure 1 is a side view of the coupling showing in full lines the operative positions of the parts and in dotted lines the releasing position of the cam lever.

Figure 2 is a longitudinal sectional view on the plane indicated by the line 2—2 of Figure 1, taken therefor in the plane of the axis of the sleeve operating cam.

Figures 3 and 4 are side views respectively of the members of the coupling detached.

Figures 5 and 6 are end views respectively of the coupling members.

Figures 7 and 8 are detail views respectively of the sleeve and the cam lever detached.

Figure 9 is a detail view of the male coupling member, the sleeve and sleeve operating cam and lever being omitted.

Figure 10 is a perspective view of the female coupling member.

The coupling members 10 and 11 are respectively of male and female types, it being understood however, that the relations are interchangeable in this respect, adapted at their outer or remote ends for engagement with hose or pipe sections indicated respectively at 12 and 13, and arranged at their inner or approximate ends to abut with an interposed yielding washer or gasket 14. Carried respectively by the coupling members as the interlocking element 15 and 16, the former of which consists of a sleeve fitted for longitudinal movement upon one of the coupling members, and a head having shouldered arms 17 for engagement with cam faced flanges 18 on the sleeve, said arms being in engagement with the flanges by a transverse, preferably revoluble movement of one of said elements relative to the other. To permit of the arrangement of said interlocking element in engaging position, the sleeve is longitudinally slotted as shown at 19, the width of the slots being sufficient to receive the shouldered extremities of the arms 17, so that, after bringing the interlocking elements toward each other sufficiently to locate the shouldered extremities of said arms in the slots of the sleeve, a rotary movement of one of the elements relative with the other will cause the engagement of the shoulders with the cam faces of the flanges which will tend to draw the sleeve toward the extremity of the coupling member upon which it is mounted to slide.

Formed upon, or rigidly secured to, and preferably cast integrally therewith the coupling member 10 upon which the sleeve is mounted to slide, are lugs 19' which are received respectively in the longitudinal slots of the sleeve, so that the latter may be formed independently of the coupling member and applied thereto by slipping the same over the outer end of the member, and each lug and the closed end of the slot in the sleeve opposite to the lug is undercut so as to form in said lugs and the closed end of the slot seats 20 and 21 for the reception of opposite edges of a cam 22 interposed between the same, one cam being arranged preferably upon each side of the sleeve, or with relation to each of said lugs, and adapted when turned to move the sleeve longitudinally of the coupling member upon which it is mounted, or more properly to move the coupling member relative to the sleeve so as to impel it longitudinally or axially toward the other coupling member, said interlocking elements consisting of the sleeve and shouldered arms remaining in a fixed relation after the engagement of the shoulders of said arms with the cam faced flanges of the sleeve. This movement of the cam to effect the relative longitudinal movement of the coupling member is effected by means of arms or levers 23 preferably connected by a yoke 24 which when the cams are in their coupling member advancing or locking position are arranged longitudinally of the coupling member as indicated in full lines in Figure 1, with the yoke straddling the coupling member 11 at a point beyond the head forming the body portion of the interlocking element 16.

Thus it will be understood that the parts including the coupling members proper, the interlocking element consisting of the sleeve and head carrying the shouldered arm and the cam connected by the yoke lever, may be formed separately or independently, but it is preferred that the interlocking element 16 consisting of the head with the shouldered arms be either passed integrally with the member 11 or secured rigidly thereto in any convenient manner, so that in uniting the members a turning movement of the coupling member 11 with reference to the member 10 will effect the engagement of the shouldered arms with the cam flanges of the sleeve. Obviously however, the sleeve may be applied to the coupling member 10 after the formation of the several parts, and such engagement serves to lock the cams which are connected by the yoke lever in the seats formed in the facing portions of the lugs and the closed ends of the slots of the sleeve, so that after the interlocking elements have been engaged as described it is only necessary to swing the lever down to the alined position indicated in Figure 1 to cause such relative longitudinal or endwise or axial movement of the coupling members as to effect a satisfactory joint at the abutting extremities thereof.

Having thus described my invention what I claim as new is:—

A coupling having terminally abutting members, interlocking elements carried by said members consisting of a sleeve mounted upon one member and shouldered arms mounted upon the remaining member, cam faced flanges provided on said sleeve, said arms being in engagement with said flanges by a transverse revoluble movement of one of said elements relative to the other, said sleeve being longitudinally slotted to receive the shouldered extremities of said arms, cams arranged to operate in said slots, a yoke straddling said coupling member at a point beyond the head forming the body portion of the interlocking element, and yoke levers connecting the cams for swinging movement relative to the coupling members.

In testimony whereof I affix my signature.

THOMAS J. GRIER.